United States Patent
Wang et al.

(10) Patent No.: US 6,835,020 B2
(45) Date of Patent: Dec. 28, 2004

(54) BI-DIRECTION SELF-PIERCING RIVETING

(75) Inventors: Pei-Chung Wang, Troy, MI (US); Shixin Jack Hu, Ann Arbor, MI (US); Kaushik Iyer, Newark, DE (US); Felicia L. Brittman, Ann Arbor, MI (US); Daniel B. Hayden, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/405,981

(22) Filed: Apr. 2, 2003

(65) Prior Publication Data

US 2004/0197137 A1 Oct. 7, 2004

(51) Int. Cl.⁷ .................................................. F16D 1/00
(52) U.S. Cl. ..................... 403/278; 403/408.1; 411/501; 411/502
(58) Field of Search ................................. 411/500, 501, 411/502, 503, 504, 505, 506, 507; 403/408.1, 278, 279, 280

(56) References Cited

U.S. PATENT DOCUMENTS

| | | | | |
|---|---|---|---|---|
| 3,359,847 A | * | 12/1967 | Richmond | ................... 411/506 |
| 3,848,389 A | * | 11/1974 | Gapp et al. | .................. 411/504 |
| 6,276,050 B1 | | 8/2001 | Mauer et al. | |
| 6,325,584 B1 | | 12/2001 | Marko et al. | |
| 2003/0202845 A1 | * | 10/2003 | Xie et al. | .................... 403/326 |
| 2004/0052581 A1 | * | 3/2004 | Assler et al. | ............ 403/408.1 |

* cited by examiner

*Primary Examiner*—John Cottingham
(74) *Attorney, Agent, or Firm*—Kathryn A. Marra

(57) ABSTRACT

A sheet metal assembly includes first and second metal sheets having flanges extending from the sheets. The flanges overlap and are in engaged parallel facing relation for a width between outer edges and flanges. At least one pair of self-piercing rivets joins the flanges at spaced locations along the width. The rivets each have a head and a shank extending into the flanges from opposite sides. The rivet heads of each pair are located in opposite flanges and are spaced further from the outer edges of their respective flanges (nearer the load-application ends) than are the shank portions of other rivets of the pair.

9 Claims, 3 Drawing Sheets

BI-DIRECTION SELF-PIERCING RIVETING

TECHNICAL FIELD

This invention relates to joints produced by the self-piercing riveting (SPR) process. More particularly, it relates to maximizing the strength of an SPR lap joint that consists of two rows of self-piercing rivets without increasing the width of the overlap region (flange width) or the quantity of material used in any manner.

BACKGROUND OF THE INVENTION

In self-piercing riveting (SPR), a tubular rivet made from a high-strength steel alloy is forced through a pair of partially overlapping sheets that are supported by a rigid circular die with an axisymmetric cavity. The diameter of the die and rivet are similar. The sheet material is typically an automotive aluminum alloy such as AA6111-T4 or AA5754-O. The joint is cold-formed with the rivet walls experiencing large amounts of compressive plastic deformation. The upper sheet is pierced through its entire thickness by the rivet, predominantly in shear, and the lower sheet is pierced only partially. Piercing forces cause the lower sheet to flow into the die cavity locally and conform to the cavity shape. The entire process is completed in about one second.

Any means of increasing the mechanical (static and fatigue) strengths of SPR joints through the modification of only particular values of process parameters within the existing set is highly desirable. Current methods for producing SPR joints generally involve riveting from one direction only. Even when practical constraints force riveting from opposite directions, the influence of different rivet orientations on joint mechanical (static and fatigue) strength is unknown.

SUMMARY OF THE INVENTION

The present invention relates to the maximization of joint strength (static and fatigue) by selecting a particular combination of riveting directions, i.e., rivet orientations. It also provides design-guidelines relating to the variation in joint mechanical strength for different combinations of riveting orientation.

The present invention provides an assembly and method, which increases the mechanical (static and fatigue) strength of a self-piercing riveted lap joint without increasing flange width, that is, material used in the overlap region. Strength is increased by inserting pairs of adjacent rivets on opposite sides of the flange in a particular configuration. The rivets are driven into the opposite sides of the flange by using multiple rivet driving apparatuses, which are capable of driving rivets in opposite directions.

When a tension load is put upon a riveted flanged assembly, the area surrounding a rivet becomes a high stress area. Testing shows the area around the head of the rivet tends to be the area of highest stress. As a result, the high stress area around the head of the rivet tends to break before any other part of the assembly. It has been determined that the mechanical strength of a joint can be maximized by placing the heads of rivets on opposing sides of a flanged assembly near the interior portions of the flanges, closest to the loaded ends of the sheets.

By dividing the number of high stress areas between both flanges of the assembly, the stress is shared between the metal sheets. As a result, the strength of the joint holding the assembly together is increased without increasing the width of the flange.

These and other features and advantages of the invention will be more fully understood from the following description of certain specific embodiments of the invention taken together with the accompanying drawings.

DESCRIPTION OF THE PREFERRED EMBODIMENT

Figure 1:
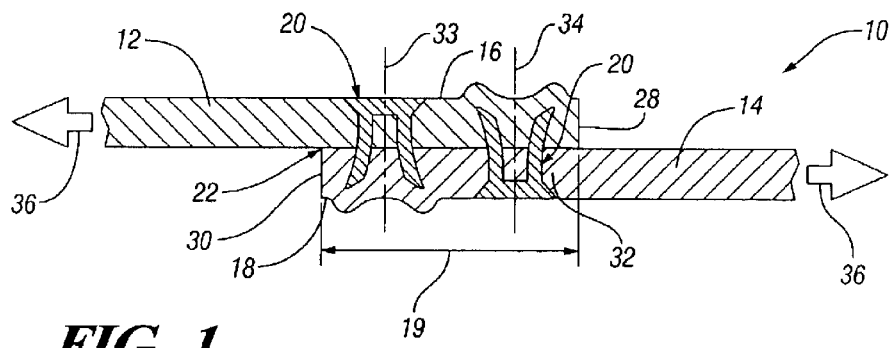
FIG. 1 is a cross-sectional view of a double riveted lapshear joint assembly illustrating the placement of rivets according to the present invention.
Figure 2:
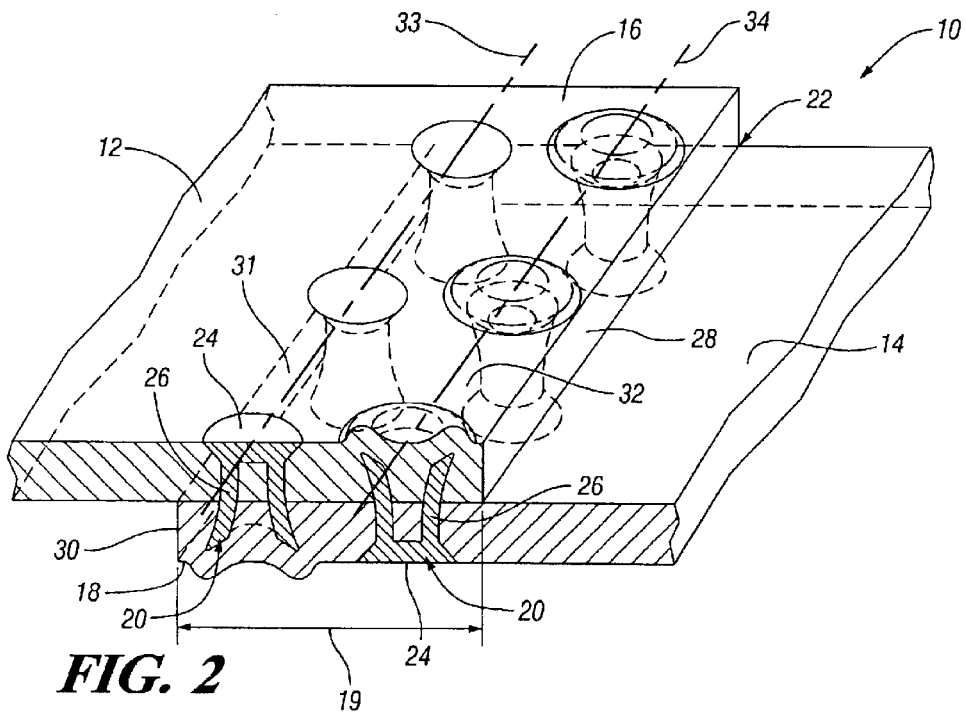
FIG. 2 is a pictorial view showing the riveted assembly of FIG. 1.

Referring first FIGS. 1 and 2 of the drawings, numeral 10 generally indicates a structural assembly such as a panel or portion of a frame for automotive use. Assembly 10 includes first and second sheets 12, 14 made of a light metal such as aluminum or aluminum alloy. The sheets have overlapping portions defining linearly extending flanges 16, 18 overlapped by a width dimension 19. The flanges of assembly 10 are joined by self-piercing rivets 20 spaced longitudinally along the flange to form a riveted joint 22.

One end of a rivet forms a head 24 and the opposite end forms a shank 26 extending from the head of the rivet. The rivet shank 26 is typically hollow or partially hollow and cylindrical in shape. Shank 26 is deformed by the die when the rivet is pressed into the flanges 16, 18.

The process of self-pierce riveting a lapshear joint riveting involves overlapping the flanges 16, 18 and inserting the overlapped flanges into a rivet driving apparatus, not shown. The rivet driving apparatus clamps the flanges between a die and a rivet driver. The driver presses a rivet into the metal flanges 16, 18 causing a localized portion of the flanges to deform into the die. Pressure from the rivet 20 compresses deformed metal into the die, causing the metal to take the form of the die. The deformed metal and rivet form a mechanical joint 22, which holds the assembly together.

In accordance with the present invention, multiple rivets 20 are used to form each joint 22. In a preferred embodiment, at least two rivets 20 are used at each riveting location along the length of the joined flanges. The two rivets at each location are spaced laterally along the width dimension 19 of the flanges and are positioned inward from opposite edges 28, 30 of the flanges 16, 18.

As shown in FIGS. 1 and 2, the two rivets 20 are located symmetrically, but facing in opposite directions with the heads 24 on opposite sides of the flanges. The heads 24 of the two rivets are located at interior portions 31, 32 of the flanges 16, 18 as far as possible from the adjacent edges 28, 30 of their respective flanges 16, 18.

For example, one row 33 of rivets 20 is driven through the upper flange 16 into the lower flange 18. The rivets 20 of row 33 have their heads 24 in the upper flange 16 and at the interior portion 31 of the flange spaced farthest from its edge 28. The shanks 26 of these rivets 20 extend into the lower flange 18 and are spaced closest to the edge 30 of the lower flange. A second row 34 of rivets 20 are driven through the lower flange 18 into the upper flange 16. The rivets 20 of this row 34 have their heads 24 in the lower flange 18 at the interior portion 32 and spaced farthest from its edge 30. The shanks of these rivets 20 extend into the upper flange 16 and are spaced closest to the edge 28 of the upper flange.

In use of the riveted assembly 10 of FIGS. 1 and 2, when the metal sheets 12, 14 are loaded in tension linearly in the direction of arrows 36, the offset metal sheets begin to rotate about the joint 22. They rotate because they are overlapping and do not lie in the same plane. If the bending forces pulling the assembly 10 apart are excessive, the joint 22 fails. The amount of force needed to break the joint depends upon the placement of the rivets 20. The relationships between rivet placement and joint strength are shown in the following two tests.

Figure 3:
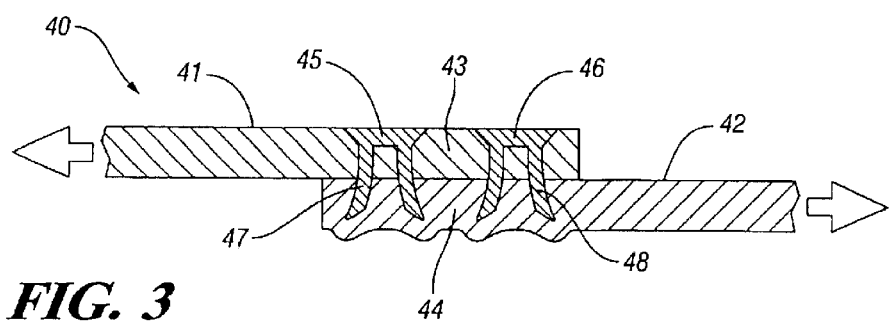
FIG. 3 is a diagrammatic view of a first test embodiment of double riveted lapshear joint.
Figure 4:
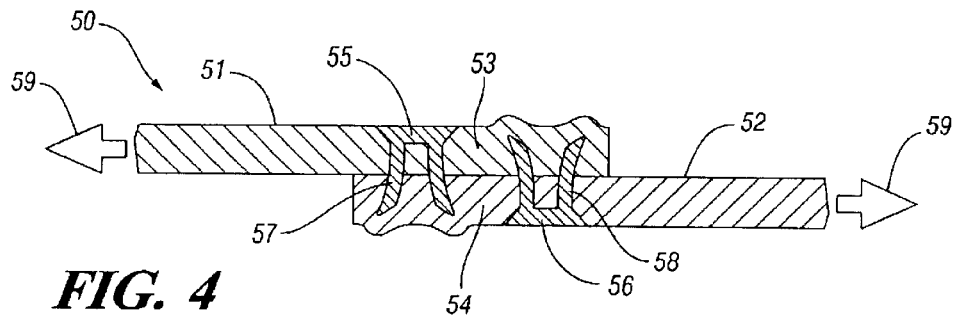
FIG. 4 is a diagrammatic view of a second test embodiment of double riveted lapshear joint.
Figure 5:
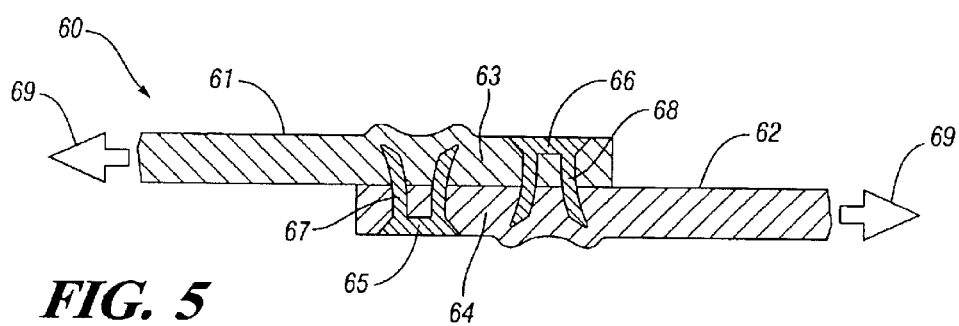
FIG. 5 is a diagrammatic view of a third test embodiment of double riveted lapshear joint.

In the case of a 2 rivet-row joint with identical sheets (material and thickness) there are 3 possible combinations of rivet orientations, as shown in FIGS. 3–5, owing to the asymmetry of the rivet geometry. Tensile tests were conducted on these three embodiments.

In FIG. 3, numeral 40 indicates a first test embodiment of double rivet lapshear joint having first and second sheets 41, 42 having overlapping upper and lower flanges 43, 44. The flanges are joined by two rivets with heads 45, 46 countersunk in the upper flange 43 while the shanks 47, 48 extend into the lower flange 44.

A second test embodiment 50 is shown in FIG. 4 having first and second sheets 51, 52 having overlapping upper and lower flanges 53, 54. The flanges are joined by a first rivet with head 55 countersunk in the upper flange 53 while the shank 57 extends into the lower flange 54, and a second rivet with head 56 countersunk in the lower flange 54 and its shank 58 extends into the upper flange 53. The countersunk heads 55, 56 of the two rivets are spaced farthest from the edges of the flanges 53, 54 where they are under direct loading when the sheets are pulled in the direction of arrows 59, similar to assembly 10.

A third test embodiment 60 is shown in FIG. 5 having first and second sheets 61, 62 having overlapping upper and lower flanges 63, 64. The flanges are joined by a first rivet with head 65 countersunk in the lower flange 64 while the shank 67 extends in the upper flange 63, and a second rivet with head 66 countersunk in the upper flange 63 and its shank 68 extends into the lower flange 64. The countersunk heads 65, 66 are nearest the edges of the flanges 63, 64 where they are shielded from direct loading when the sheets are pulled in the direction of arrows 69.

Figure 6:
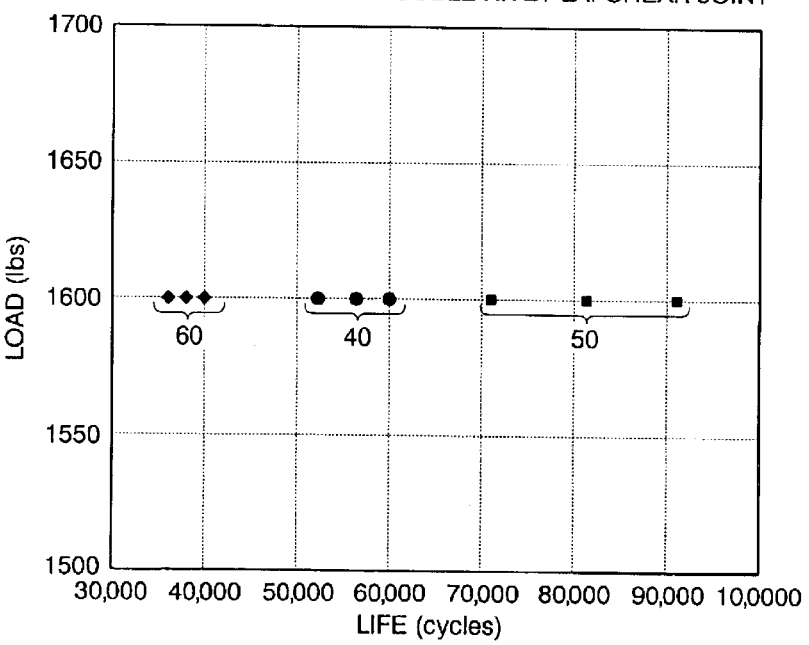
FIG. 6 is a graph comparing fatigue performance of the double riveted lapshear joints of FIGS. 3–5.

FIG. 6 is a graph illustrating the effects of rivet head placement relating to fatigue performance of double rivet lapshear joints. The graph illustrates fatigue performance by showing the number of cycles an assembly can endure for a given load before failure. The test results graphically illustrate that test embodiment 60 is the weakest because it fails at less than 40,000 cycles. Test embodiment 40 is stronger than embodiment 60 and is able to withstand up to 60,000 cycles. Embodiment 50 is the strongest because it is able to withstand between 70,000 and 90,000 cycles before failing.

Figure 7:
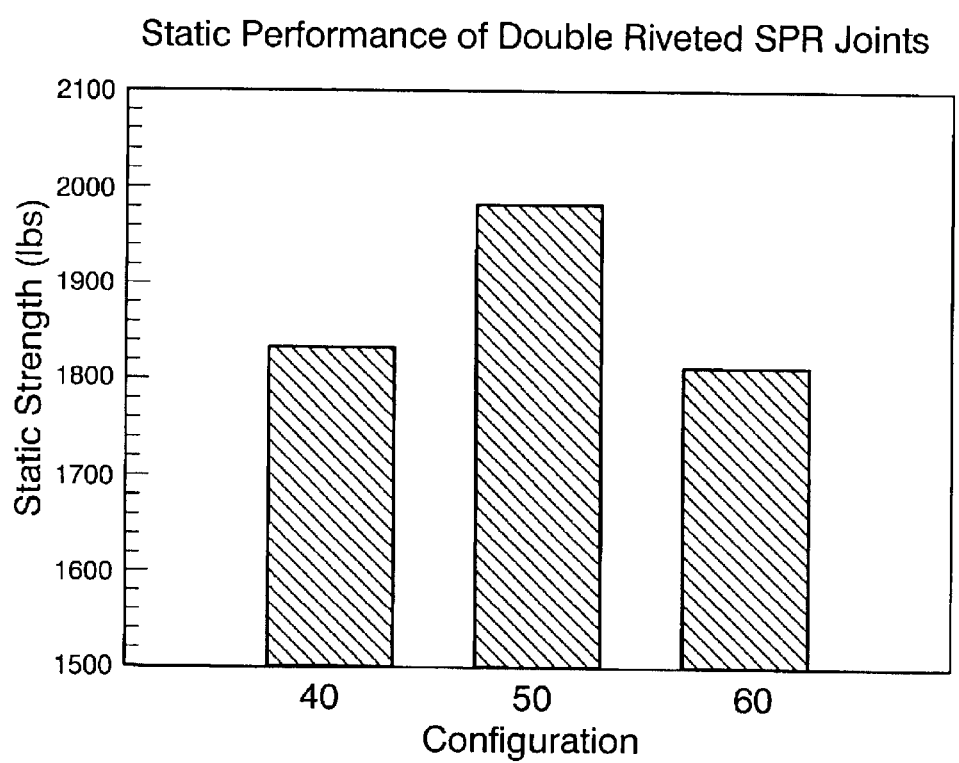
FIG. 7 is a graph comparing static performance of double riveted lapshear joints of FIGS. 3–5.

FIG. 7 of the drawings is a graph presenting the results of static performance tests on embodiments 40, 50 and 60. In these tests, embodiments 40, 60 were able to withstand approximately 1800 lbs. before failing. Embodiment 50 is again the strongest, which was able to withstand approximately 2000 lbs. before failing.

Embodiment 50 has the most static and cyclic (fatigue) mechanical strength because the heads 55, 56 of the rivets are located at the inward portions of the flanges 53, 54 to provide the greatest strength and support to the highest stressed areas of the joint. The bending stresses are thus equally divided between the sheets 51, 52 at their highest stresses points, resulting in the maximum static and fatigue performance. Embodiment 40 is weaker than embodiment 50 apparently because the location of the rivet heads 45, 46 gives inadequate support to the lower sheet 42, causing it to fail. Similarly, embodiment 60 is weaker than embodiment 50 because the rivet heads 65, 66 are placed at the ends of the flanges, away from the zone of highest bending stress where the rivet shanks 66, 67 are located.

While the invention has been described by reference to certain preferred embodiments, it should be understood that numerous changes could be made within spirit and scope of the inventive concepts described. Accordingly, it is intended that the invention not be limited to the disclosed embodiments, but that it have the full scope permitted by the language of the following claims.

What is claimed is:

1. A metal sheet metal assembly, comprising:
   first and second sheets having overlapping portions defining first and second flanges extending in engaged parallel facing relation for a predetermined width extending between and normal to spaced outer edges of the flanges;
   at least one pair of self-piercing rivets joining the flanges at spaced locations along the width, the rivets of each pair having a head and a shank and extending into the flanges from opposite sides thereof;
   the heads of the first and second rivets being located at interior portions of the first and second flanges, respectively, and the shanks of the first and second rivets extending into the second and first flanges, respectively, adjacent the edges thereof; and
   wherein each rivet has a single head and a shank which does not penetrate through the flange opposite from the head.

2. A sheet metal assembly as in claim 1 wherein the heads of the rivets are spaced equally from the edges of their respective flanges.

3. A sheet metal assembly as in claim 1 including at least one additional said pair of self-piercing rivets arranged in two spaced rows along said flanges with the heads of the rivets of one row located in one of the flanges and the heads of the rivets of the other row located in the other of the flanges.

4. A sheet metal assembly as in claim 3 wherein the rows of rivets are arranged parallel with one another and with the spaced outer edges of the flanges.

5. A sheet metal assembly as in claim 1 wherein the metal sheets are formed of substantially the same material and thickness.

6. A sheet metal assembly as in claim 1 wherein the shank is at least partially hollow.

7. A method of forming a sheet metal assembly, the method comprising the steps of:

positioning first and second oppositely extending metal sheets having similar sheet gages with linearly extending flanges overlapping in engaged parallel facing relation for a predetermined width between outer edges of the flanges driving at least one pair of self-piercing rivets into the flanges at spaced locations along the width, the rivets of each pair having a single head and a shank and extending into the flanges from opposite sides thereof;

the heads of the rivets of each pair being located in opposite flanges and spaced in the flanges further from the outer edges of their respective flanges than are the shank portions of the other rivets of the pair.

8. A method as in claim 7 wherein the driving step is performed by a C-shaped driving apparatus having upward and downward facing rivet guns to insert rivets on opposite sides of the metal sheets.

9. A method as in claim 7 including driving multiple pairs of self-piercing rivets into the assembly, the pairs aligned in rows spaced parallel with the outer edges of the flanges.

* * * * *